Oct. 24, 1950     W. L. GORDEN     2,527,251
CHAIN SAW
Filed March 31, 1945     2 Sheets-Sheet 1
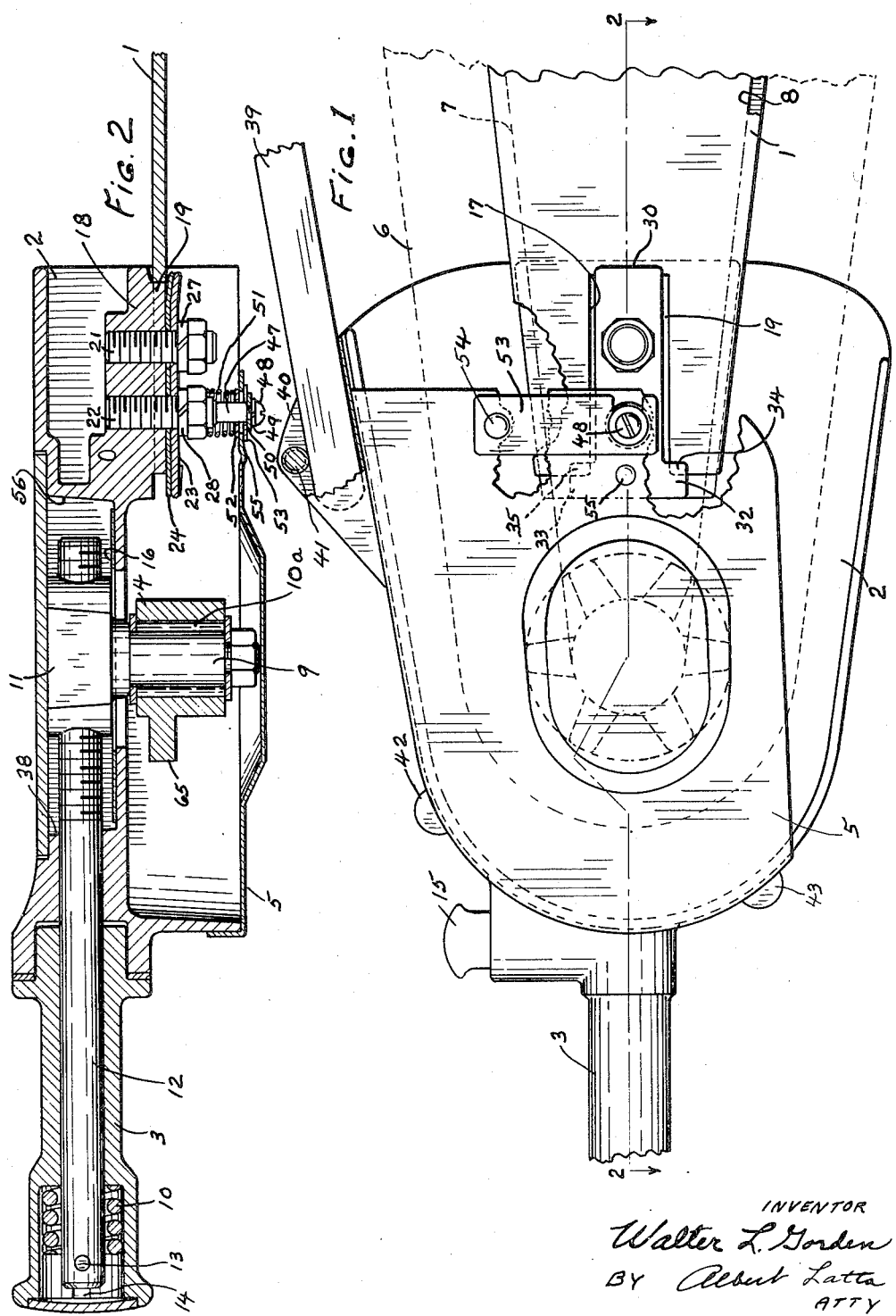
INVENTOR
Walter L. Gorden
BY Albert Latta
ATTY

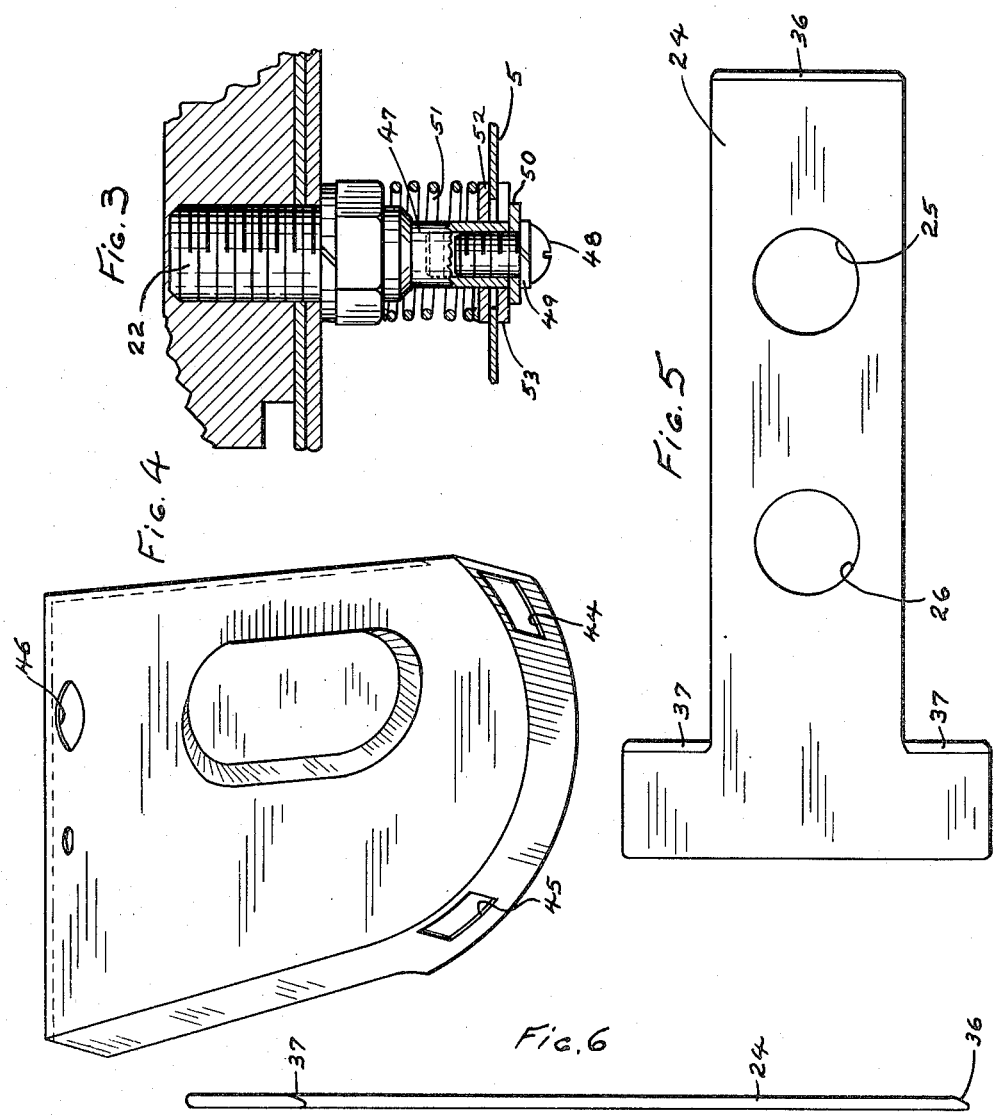

Patented Oct. 24, 1950

2,527,251

UNITED STATES PATENT OFFICE 2,527,251

CHAIN SAW

Walter L. Gorden, Chicago, Ill., assignor to Mall Tool Company, Chicago, Ill., a corporation of Illinois Application March 31, 1945, Serial No. 585,913

13 Claims. (Cl. 143—32)

My invention relates to chain saw machines and has particular reference to an improved idler assembly for such a machine. The principal object of my invention is to provide an idler assembly which may be quickly removed from the rest of the chain saw machine to permit ready withdrawal of the chain and its guiding plate from the kerf of a tree when pinching occurs.

Another object of my invention is to provide a quickly removable cover for the idler assembly. Other objects and advantages of my invention will become apparent upon reading the following specification and upon examination of the drawings in which Fig. 1 is a side elevation of my improved idler assembly parts being broken in section to more clearly show my invention;

Fig. 2 is a cross sectional view taken on line 2—2 of Fig. 1;

Fig. 3 is an enlarged fragmentary view of the cover securing latch device;

Fig. 4 is a perspective view of the cover;

Fig. 5 is a detail view of the guide plate retaining spring; and

Fig. 6 is a side detail view of the spring shown in Fig. 5.

Referring to Figs. 1 and 2, I have shown my improved idler assembly which is located at one end of a chain saw machine such as is shown in application of Arthur W. Mall and Walter L. Gorden, Serial No. 530,786, filed April 13, 1944, now Patent No. 2,444,132. The idler assembly is supported by the chain guide plate 1, about which the cutting chain is trained. The guide plate 1 is provided at the opposite end with a power unit (not shown), thus forming the complete chain saw machine of the type shown in the above mentioned application.

The idler assembly consists generaly of a main casting 2, handle member 3, sprocket 4, and cover 5. The cutting chain 6, as shown in dotted lines in Fig. 1 is trained about the guide plate 1, riding in grooves 7 and 8, which are formed along the longitudinal edges of the guide plate 1. The cutting chain 6 extends around sprocket 4 and is drivingly engaged by sprocket teeth 65. The sprocket 4 is rotatably mounted on sprocket shaft 9 by means of anti-friction bearing 10a, the sprocket shaft 9 being a stationary shaft.

The cutting chain 6 is maintained under resilient tension at all times by means of spring 10, said resilient tension means functioning in the manner as shown in application of A. W. Mall and W. L. Gorden, Serial No. 554,679, filed September 18, 1944.

Sprocket carrier 11 screw threadedly receives adjustment rod 12 which is slidably and rotatably journaled in casting 2. Rod 12 is slidable relative to handle 3 but rotates along with handle 3 as a result of pin 13 which rides in slot 14 in handle 3. Handle 3 may be locked relative to casting 2 by means of locking pin 15 which functions in the manner as shown in above mentioned application, Serial No. 554,679. Sprocket carrier 11, is longitudinally movable in a rectilinear direction only within chamber 56, as more fully described in application Serial No. 554,679 and application No. 530,786. A bearing plate 16 relieves casting 2 of the wearing action resulting from movement of sprocket carrier 11 within chamber 56. It can be seen that the tension of the cutting chain can be increased or decreased by withdrawing pin 15 and rotating rod 12 by means of handle 3, causing sprocket carrier 11 to move in either direction desired. Spring 10 continually urges rod 12 and sprocket carrier 11 outwardly away from guide plate 1, said spring being continually biased against pin 13.

When felling or bucking a tree, frequently the chain saw machine becomes pinched within the kerf in the tree. When this occurs the chain saw machine is most easily withdrawn from the tree by pulling it longitudinally in the line of direction of the kerf. In order to do this it is necessary that the idler assembly be removed from the chain guiding plate 1, so as to permit the guide plate 1 and cutting chain 6 to be pulled through the kerf. One important feature of my invention is to provide an idler assembly which is quickly removable from the guide plate 1 and cutting chain 6 to facilitate quick withdrawal of the guide plate and chain from the kerf and which, after being withdrawn from the kerf, can be readily fastened again to the guiding plate 1.

Guide plate 1 is provided with an elongated slot 17. Casting 2 is provided with a protruding lug member 18 which has a rectilinear shaped lip 19, which is machined to be accurately received within slot 17 of guide plate 1 providing rigid supporting means for the guide plate 1.

The guide plate 1 is secured to casting 2 by means of bolts 21 and 22 which are threaded into lug member 18. A pair of spring plates 23 and 24 are identical in construction except for the fact that one of these spring plates is preferably made of slightly thicker material than the other spring plate. The spring plates 23 and 24 are provided with drilled openings 25 and 26 through which securing bolts 21 and 22 extend. Bolts 21 and 22 are securely tightened against the spring plates 23 and 24 so that said plates are firmly pressed against the face of lip 19. Said bolts 21 and 22 are provided with lock washers 27 and 28 to lock the spring plates 23 and 24 flat against lip 19 and are intended to remain in this locked condition, except when it is desired to loosen bolts 21 and 22 to replace spring plates 23 and 24 with new spring plates. The outer extremities of spring plates 23 and 24 are capable of being sprung outwardly away from lip 19 when guide plate 1 is inserted in the working position as shown in Figs. 1 and 2. Viewing Fig. 1, it will be noted how the inner ends 30 of spring plates 23 and 24 slightly overlap part of the guide plate at the base of slot 17. The outwardly extending ears 32 and 33 also overlap a portion of the guide plate as indicated at 34 and 35. Thus viewing Fig. 1 it can be seen that the spring plates are biased against guide plate 1 at three spaced locations and the amount of bias is sufficient to maintain the guide plate in fixed position relative to casting 2, while the chain saw machine is being operated.

It will be noted in viewing Fig. 6 that the corners 36 and 37 on spring plate 24 are ground off to provide a tapered runway to permit the guide plate to slip past the outer ends of spring plates when being inserted into working position. When it is desired to remove the idler assembly from the guide plate 1, this is accomplished by rotating handle 3 so as to permit sprocket carrier 11 to move toward guide plate 1, thus causing slack in the cutting chain, permitting the chain to be removed from sprocket 4. When the chain is thus removed, handle 3 is jerked backwardly until sprocket carrier 11 impinges against wall 38. The jarring action causes casting 2 to be retracted away from guide plate 1 until the spring plates 23 and 24 no longer overlap any portion of the guide plate where upon the idler assembly is then readily completely removable from guide plate 1 and cutting chain 6.

The removal of the idler assembly as previously set forth in the preceding paragraph, however, first contemplates the removal of cover 5 and guard bar 39. Guard bar 39 is slidably mounted in the bifurcated ear 40 and is prevented from swinging outwardly by means of rivet 41 which spans the slot in ear 40. Guard bar 39 is removed from casting 2 simply by retracting said casting away from guide plate 1 in a rectilinear direction as governed by the lip 19.

The cover 5 is a quickly removable cover which is supported on casting 2 by means of the ears 42 and 43 which are formed integrally with casting 2. Cover 5 is provided with elongated slots 44 and 45 through which ears 42 and 43 extend. At the opposite end of the cover a hole 46 is provided for receiving the outer end of bolt 22. Viewing Fig. 3 it will be noted that the outer end of bolt 22 is provided with a shank 47, which is internally threaded to receive locking screw 48. It will be noted that the hole 46 in cover 5 is of sufficient diameter to rather loosely fit over the shank portion 47 of bolt 22, thus permitting cover 5 to be easily assembled in the proper position on casting 2. Screw 48 is securely fastened relative to shank 47 of bolt 22 by means of lock washer 49 which impinges against washer 50 which in turn impinges against the outer extremity of shank 47. The cover 5 is axially movable along shank 47, being resisted by tension spring 51 which is continually biased against washer 52. A latch 53, which is pivotally mounted on cover 5 by means of rivet 54, secures the cover to prevent it from coming off of shank 47. When it is desired to remove the cover, the latch 53 is retracted about pivot 54, thus permitting cover 5 to be withdrawn from shank 47. It will be noted that the hole 46 in cover 5 is of greater diameter than washer 50, permitting cover 5 to slide past washer 50 when being withdrawn from shank 47. It will also be noted that when cover 5 is retracted away from shank 47 then the cutting chain 6 is free to move past shank 47 of bolt 22 when the idler assembly is being removed from the guide plate 1. Cover 5 is provided with an indented button member 55 which prevents latch member 53 from being retracted out of the latching position as shown in Fig. 1 while the saw is being operated. However, when latch 53 is forcibly retracted it slides over button 55 permitting removal of cover from shank 47.

Having thus described my invention, what I claim is:

1. In a chain saw machine, a chain guiding member, an idler assembly removably secured to one end of said chain guiding member, said idler assembly including a casting, a rectangular shaped lug on said casting, an open end slot in said chain guiding member, said lug member being received in the slot permitting longitudinal movement of the chain guiding member relative to the lug member, a pair of leaf springs secured against the face of the lug member, said chain guiding member having one face thereof disposed in face to face contact with the casting and being contacted on its opposite face in three locations by the leaf springs and being normally maintained in a secured position relative to the casting under the bias of said leaf springs.

2. A chain saw as described in claim 1 wherein said leaf springs are provided with tapered runways in the region of contact with the chain guiding member.

3. A chain saw machine as described in claim 1 wherein the leaf springs are secured against the face of the lug member substantially centrally of said leaf springs, whereby the outer extremities of said leaf springs are free to spring slightly outwardly when contacted by the chain guiding member.

4. In a chain saw machine, a chain guiding member, an idler assembly removably secured to one end of said chain guiding member, said idler assembly comprising a main support member, a T-shaped leaf spring rigidly secured to a face on said support member, one face of said chain guiding member having three-point contact with said leaf spring and the opposite face of said chain guiding member having face to face contact with the support member, whereby said chain guiding member is secured in operating position.

5. In a chain saw machine, a chain guiding member, an idler assembly removably secured to one end of said chain guiding member, said idler assembly comprising a main support member, a T-shaped leaf spring, a pair of bolts threaded into the support member and securing the leaf spring securely against a face of the support member, one face of said chain guiding member having contact with the support member and the opposite face of said chain guiding member having contact with the base and with the two wings of the T-shaped leaf spring.

6. In a chain saw machine, a chain guiding member, an idler assembly removably secured to one end of said chain guiding member, said idler assembly comprising a main support member, said chain guiding member having face to face contact with the support member, a slot in the chain guiding member, a lug on said support member protruding into the slot, the outer face of said lug lying in a plane slightly beneath the plane defined by the outer face of the chain guiding member, a leaf spring rigidly secured to the face of the lug, whereby when the chain guiding member is inserted into operating position, said chain guide member contacts the leaf spring and is held under continuous bias of said spring.

7. A chain saw machine as described in claim 6 wherein the leaf spring is tapered slightly at the edges where initial contact with the chain guiding member is made, when the chain guiding member is inserted in operating position.

8. A chain saw machine as described in claim 6 wherein the lug is rectangular shaped and the slot in the chain guiding member has parallel opposing walls which closely embrace the side walls of the lug whereby to permit longitudinal rectilinear movement of the chain guiding member only relative to the lug.

9. In a chain saw machine, a chain guiding member, an idler assembly removably secured to one end of said chain guiding member, said idler assembly comprising a main support member, resilient means secured to one of said members and engaging the other of said members including a resilient clamping member adapted to engage the other member in clamping relationship for securing the chain guiding member to the support member, a stud projecting outwardly from the support member, a cover, means associated with said stud for removably securing the cover to the support member.

10. A chain saw machine as described in claim 9 wherein the last named means comprises a latch that is pivotally secured to the cover, the free end of said latch being adapted to engage the outer end of the stud to maintain the cover in fixed position relative to the support member.

11. A chain saw machine as described in claim 9, wherein a pair of spaced ears on the support member extend through mating slots in the cover.

12. In a chain saw machine, a chain guiding member, an idler assembly removably secured to one end of the chain guiding member and comprising a main supporting member, a sprocket rotatably mounted on the main supporting member, the supporting member having one face provided with planar engaging portions providing for facial contact over a relatively large area, the chain guiding member having one face thereof disposed in face to face contact with the planar engaging portions, and attaching means disposed between the chain guiding member and the main supporting member, the attaching means being secured to one of the last two members and having spaced resiliently biased engaging portions adapted to engage in clamping relation the face of the second of said last mentioned two members which is opposite the face engaging said one member.

13. A chain saw machine as described in claim 12 wherein the attaching means is a leaf spring having spaced biased contacts serving as the engaging portions.

WALTER L. GORDEN.

REFERENCES CITED

The following references are of record in the file of this patent:

UNITED STATES PATENTS

| Number | Name | Date |
|---|---|---|
| 830,860 | Smith | Sept. 11, 1906 |
| 1,903,571 | Meyer | Apr. 11, 1933 |
| 2,326,854 | Hassler | Aug. 17, 1943 |
| 2,351,739 | Blum | June 20, 1944 |

FOREIGN PATENTS

| Number | Country | Date |
|---|---|---|
| 506,310 | Germany | Sept. 2, 1930 |